US012027920B2

United States Patent
Irino et al.

(10) Patent No.: US 12,027,920 B2
(45) Date of Patent: Jul. 2, 2024

(54) ROTOR, AND ROTARY ELECTRIC MACHINE

(71) Applicant: DAIKIN INDUSTRIES, LTD., Osaka (JP)

(72) Inventors: Yusuke Irino, Osaka (JP); Takaaki Ono, Osaka (JP); Yuji Nakazawa, Osaka (JP); Tatsuya Tonari, Osaka (JP); Hisato Sumitomo, Osaka (JP); Masatsugu Takemoto, Sapporo (JP)

(73) Assignee: Daikin Industries, Ltd., Osaka (JP)

(*) Notice: Subject to any disclaimer, the term of this patent is extended or adjusted under 35 U.S.C. 154(b) by 370 days.

(21) Appl. No.: 17/483,406

(22) Filed: Sep. 23, 2021

(65) Prior Publication Data

US 2022/0014058 A1 Jan. 13, 2022

Related U.S. Application Data

(63) Continuation of application No. PCT/JP2020/013295, filed on Mar. 25, 2020.

(30) Foreign Application Priority Data

Mar. 28, 2019 (JP) .................................. 2019-062688

(51) Int. Cl.
*H02K 1/27* (2022.01)
*H02K 1/276* (2022.01)
*H02K 21/16* (2006.01)

(52) U.S. Cl.
CPC .......... *H02K 1/2766* (2013.01); *H02K 21/16* (2013.01)

(58) Field of Classification Search
CPC ....... H02K 21/16; H02K 1/278; H02K 1/2783
See application file for complete search history.

(56) References Cited

U.S. PATENT DOCUMENTS

2002/0180294 A1* 12/2002 Kaneda ................ H02K 1/2783
310/156.43
2015/0091407 A1 4/2015 Kayano et al.
2020/0287450 A1 9/2020 Li et al.

FOREIGN PATENT DOCUMENTS

DE         3429813 A1    2/1986
DE   11 2012 006 417 T5   2/2015
(Continued)

OTHER PUBLICATIONS

International Preliminary Report of corresponding PCT Application No. PCT/JP2020/013295 dated Oct. 7, 2021.
(Continued)

*Primary Examiner* — Tran N Nguyen
*Assistant Examiner* — Masoud Vaziri
(74) *Attorney, Agent, or Firm* — Global IP Counselors, LLP

(57) ABSTRACT

A rotor includes a rotor core having a plurality of magnetic poles. At least one magnetic pole includes a first magnetic pole having three or more circumferentially arranged magnet holes, and a plurality of permanent magnets housed corresponding magnet holes. A portion of the rotor core between adjacent magnet holes has a radially extending region. A maximum radial dimension of each magnet hole is greater than a minimum radial dimension of a portion of the rotor core between a magnet hole radially outer surface and a rotor core outer peripheral surface. The first magnetic pole has a smaller amount of harmonic components in a radial flux density distribution on the rotor core outer peripheral surface, compared to a magnetic pole having a plurality of magnet holes arranged at equal circumferential intervals and a plurality of permanent magnets having substantially the same magnetic flux and number.

19 Claims, 15 Drawing Sheets

(56) References Cited

FOREIGN PATENT DOCUMENTS

| JP | 2002-354721 | A  | 12/2002 |
|----|-------------|----|---------|
| JP | 2005-261169 | A  | 9/2005  |
| JP | 2008-125203 | A  | 5/2008  |
| JP | 2011-147346 | A  | 7/2011  |
| WO | 2018/209738 | A1 | 11/2018 |

OTHER PUBLICATIONS

International Search Report of corresponding PCT Application No. PCT/JP2020/013295 dated Jun. 16, 2020.
Jastrzebski et al., "Design of a bearingless 100 kW electric motor for high-speed applications", 18th International Conference on Electrical Machines and Systems, Oct. 2015, pp. 2008-2014, Thailand.
European Search Report of corresponding EP Application No. 20 77 9970.1 dated Oct. 11, 2022.

* cited by examiner

ROTOR, AND ROTARY ELECTRIC MACHINE

CROSS-REFERENCE TO RELATED APPLICATIONS

This is a continuation of International Application No. PCT/JP2020/013295 filed on Mar. 25, 2020, which claims priority to Japanese Patent Application No. 2019-062688, filed on Mar. 28, 2019. The entire disclosures of these applications are incorporated by reference herein.

BACKGROUND

Field of Invention

The present disclosure relates to a rotor and a rotary electric machine.

Background Information

Rotors that have been known in the art include a buried permanent magnet (BPM) rotor that includes a plurality of permanent magnets buried in a portion of a rotor core near the outer peripheral surface thereof and circumferentially spaced apart from one another (see, for example, R. P. Jastrzebski. et al. "Design of a bearingless 100 kW electric motor for high-speed applications," 2015 18th International Conference on Electrical Machines and Systems (ICEMS), Oct. 25-28, 2015. pp. 2008-2014).

SUMMARY

A first aspect of the present disclosure is directed to a rotor including a rotor core having a plurality of magnetic poles. At least one of the magnetic poles includes a first magnetic pole having three or more magnet holes arranged in a circumferential direction, and a plurality of permanent magnets each housed in a corresponding one of the magnet holes. A portion of the rotor core between adjacent ones of the magnet holes has a region extending in a radial direction. A maximum radial dimension of each of the magnet holes is greater than a minimum radial dimension of a portion of the rotor core between a radially outer surface of the magnet hole and an outer peripheral surface of the rotor core. The first magnetic pole is configured to have a smaller amount of harmonic components in a radial flux density distribution on the outer peripheral surface of the rotor core, compared to a magnetic pole having a plurality of magnet holes arranged at equal intervals in the circumferential direction and a plurality of permanent magnets having substantially the same magnetic flux and number.

DETAILED DESCRIPTION OF EMBODIMENT(S)

First Embodiment

A first embodiment will be described below. A rotary electric machine (10) according to this embodiment is a bearingless motor. In the following description, a side of a rotor (30) close to its axis (O) is referred to as the "inner peripheral side," and a side of the rotor (30) remote from its axis (O) is referred to as the "outer peripheral side." The direction along the axis (O) of the rotor (30) is referred to as the "axial direction," and the direction orthogonal to the axis (O) of the rotor (30) is referred to as the "radial direction."

Figure 1:
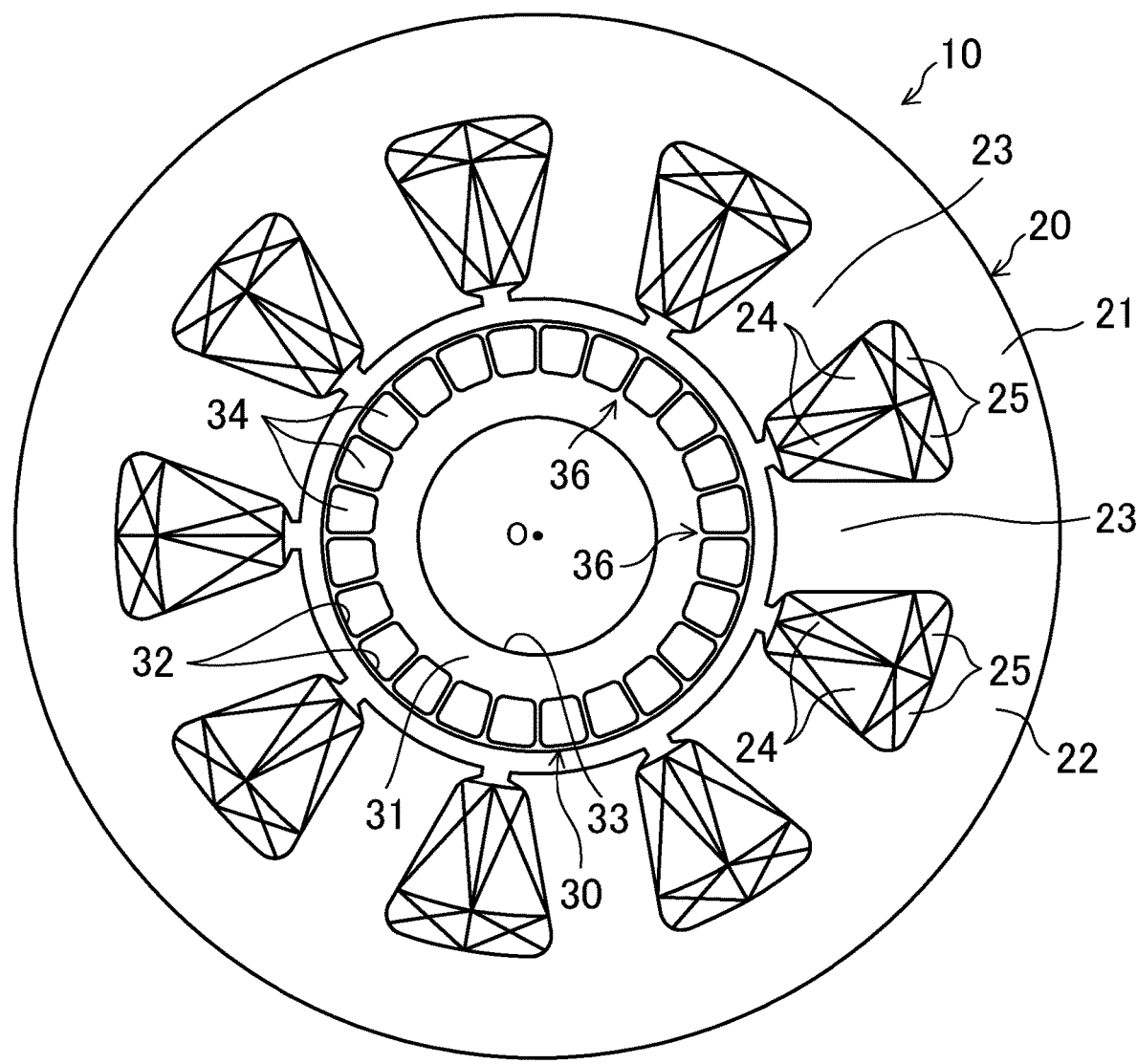
FIG. 1 is a front view illustrating a configuration of a rotary electric machine according to a first embodiment.
Figure 3:
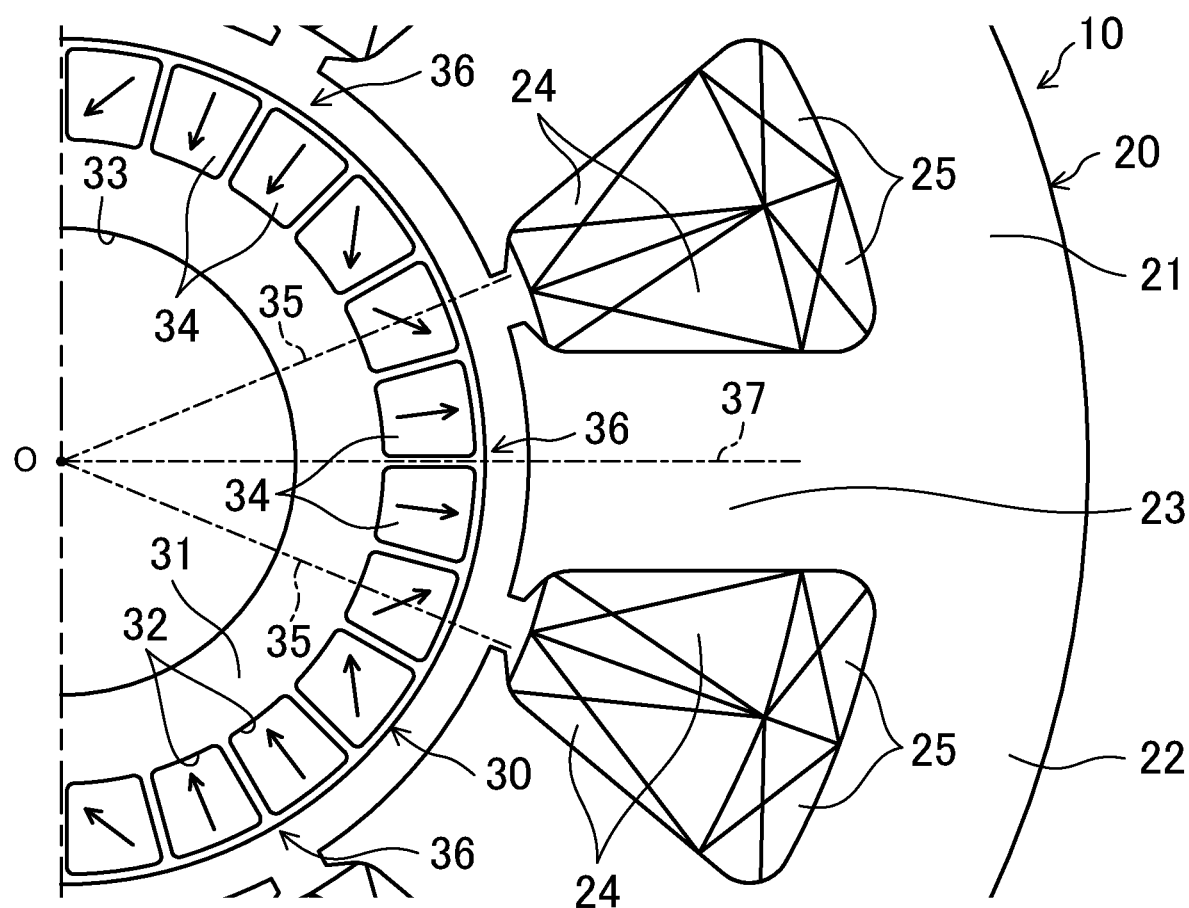
FIG. 3 is an enlarged front view illustrating an essential portion of the rotary electric machine illustrated in FIG. 1.

As illustrated in FIGS. 1 and 3, the rotary electric machine (10) includes a stator (20) and the rotor (30).

The stator (20) includes a stator core (21), driving coils (24), and supporting coils (25).

The stator core (21) is a tubular member made of a magnetic material. The stator core (21) includes a substantially cylindrical back yoke (22) disposed on the outer peripheral side of the stator core (21), and a plurality of teeth (23) protruding radially inward from the inner peripheral surface of the back yoke (22).

The driving coils (24) allow driving current for rotating the rotor (30) to flow therethrough. The driving coils (24) are wound around the associated teeth (23) by concentrated winding. The driving coils (24) constitute coils.

The supporting coils (25) allow supporting current for supporting the rotor (30) in a non-contact manner to flow therethrough. The supporting coils (25) are wound around the associated teeth (23) by concentrated winding. The supporting coils (25) constitute coils.

The rotor (30) is a buried permanent magnet (BPM) rotor. The rotor (30) is disposed radially inside the stator (20) to face the stator (20) with an air gap interposed therebetween. The rotor (30) includes a rotor core (31) and permanent magnets (34).

The rotor core (31) is a tubular member made of a magnetic material. The rotor core (31) has a plurality of magnet holes (32) near the outer peripheral surface thereof.

The magnet holes (32) run through the rotor core (31) in the axial direction. The rotor core (31) has, at its center, a shaft hole (33) for inserting a shaft (not shown) therethrough.

The permanent magnets (34) are sintered magnets containing rare earth, but should not be limited to the sintered magnets. The permanent magnets (34) are each housed in an associated one of the magnet holes (32) of the rotor core (31). In this example, four permanent magnets (34) arranged next to each other in the circumferential direction form one magnetic pole (36).

A magnetic pole (36) that includes three or more magnet holes (32) arranged next to each other in the circumferential direction and a plurality of permanent magnets (34) housed in the magnet holes (32) are hereinafter referred to as the "first magnetic pole (36)."

Figure 2:
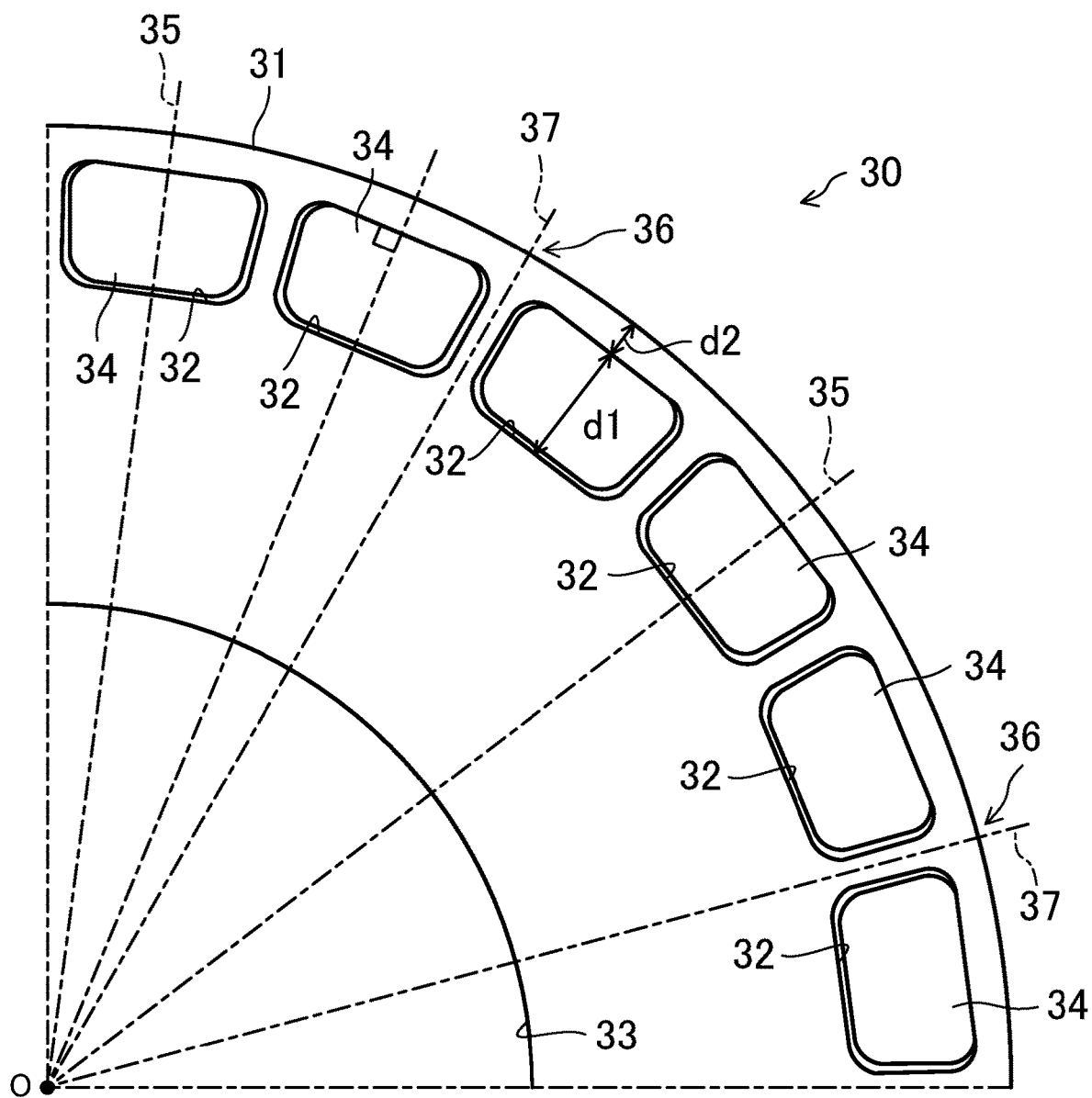
FIG. 2 is an enlarged front view illustrating an essential portion of a rotor.

As illustrated in FIG. 2, a portion of the rotor core (31) between the magnet holes (32) arranged next to each other has a region extending in the radial direction. A radially outer end surface of each magnet hole (32) is substantially symmetric with respect to the straight line passing through the axis (O) of the rotor core (31) and the circumferential center of the magnet hole (32). In the example illustrated in FIG. 2, the straight line passing through the axis (O) of the rotor core (31) and the circumferential center of the magnet hole (32) substantially coincides with a magnet centerline (35) that is the straight line passing through the center of the associated permanent magnet (34) and the axis (O) of the rotor (30).

A maximum radial dimension d1 of each of the magnet holes (32) is designed to be greater than a minimum radial dimension d2 of a portion of the rotor core (31) between the radially outer surface of the magnet hole (32) and the outer peripheral surface of the rotor core (31).

The first magnetic pole (36) is configured to have a smaller amount of harmonic components in the radial flux density distribution on the outer peripheral surface of the rotor core (31), compared to a magnetic pole comprised of a plurality of magnet holes arranged at equal intervals in the circumferential direction and a plurality of permanent magnets having substantially the same magnetic flux and number.

Specifically, as illustrated in FIG. 3, the straight line passing through the center of each first magnetic pole (36) and the axis (O) of the rotor (30) as viewed in the axial direction of the rotor (30) is defined as a magnetic pole centerline (37). The straight line passing through the center of each permanent magnet (34) and the axis (O) of the rotor (30) as viewed in the axial direction of the rotor (30) is defined as the magnet centerline (35). In FIG. 3, the magnetization directions of the permanent magnets (34) are indicated by arrows.

Each of straight lines parallel to the magnetization directions of the permanent magnets (34) at both circumferential ends of the first magnetic pole (36) is inclined with respect to the magnet centerline (35) of the associated permanent magnet (34). Each of the straight lines parallel to the magnetization directions of the permanent magnets (34) at both circumferential ends of the first magnetic pole (36) is inclined, compared to the magnet centerline (35) of the associated permanent magnet (34), in a direction toward the magnetic pole centerline (37) of the first magnetic pole (36) as the straight line approaches from the center to the radially outer end of the associated permanent magnet (34). In contrast, each of the straight lines parallel to the magnetization directions of the two intermediate permanent magnets (34) of the first magnetic pole (36) is substantially parallel to the magnet centerline (not shown) of the associated permanent magnet (34). The straight lines parallel to the magnetization directions of the two intermediate permanent magnets (34) of the first magnetic pole (36) may be inclined with respect to the magnet centerlines of the respective permanent magnets (34).

Figure 4:
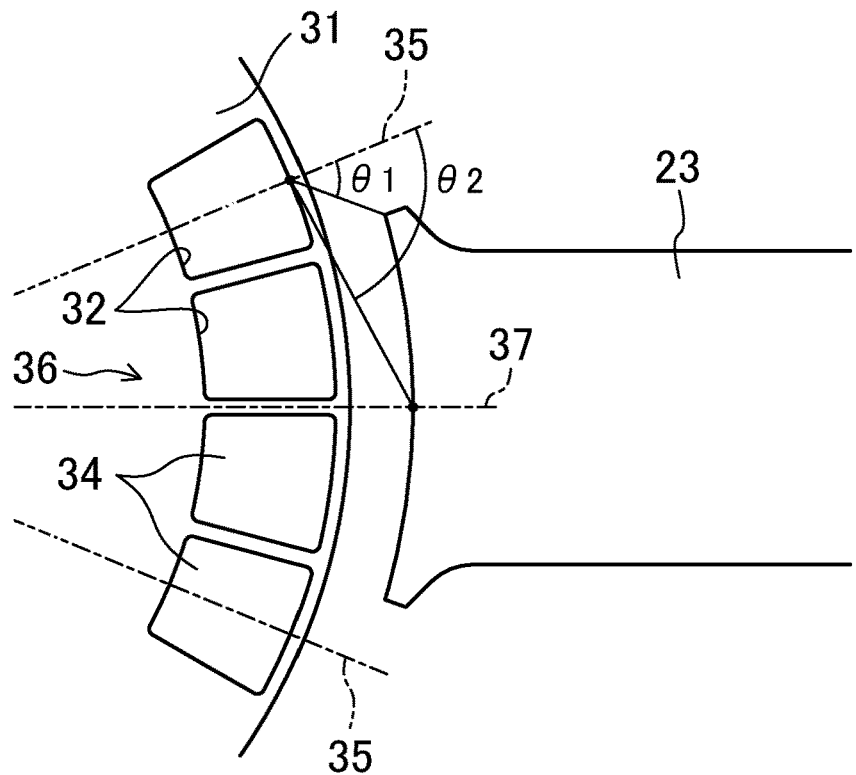
FIG. 4 is an enlarged front view for explaining a range of magnetization directions.

Referring to FIG. 4, a preferred range of the magnetization direction of each of the permanent magnets (34) at both circumferential ends of the first magnetic pole (36) will be described. In the state shown in FIG. 4 (hereinafter referred to also as the "center-aligned state"), the magnetic pole centerline (37) of the first magnetic pole (36) passes through the circumferential center of one of the teeth (23) facing the first magnetic pole (36).

In this center-aligned state, if straight lines parallel to the magnetization directions of the permanent magnets (34) at both circumferential ends of the first magnetic pole (36) each have a relatively small inclination with respect to the magnet centerline (35) of the associated permanent magnet (34), each of the straight lines preferably connects the center of the outer peripheral surface of the associated permanent magnet (34) and an end of the inner peripheral surface of the tooth (23). In this case, an angle formed between the straight line parallel to the magnetization direction of the permanent magnet (34) and the magnet centerline (35) of the permanent magnet (34) is θ1 shown in FIG. 4. If the angle is greater than or equal to θ1, the magnetic flux of each permanent magnet (34) is effectively linked with the tooth (23).

In the center-aligned state, if the straight lines parallel to the magnetization directions of the permanent magnets (34) at both circumferential ends of the first magnetic pole (36) each have a relatively large inclination with respect to the magnet centerline (35) of the associated permanent magnet (34), each of the straight lines preferably connects the center of the outer peripheral surface of the associated permanent magnet (34) and the center of the inner peripheral surface of the associated tooth (23). In this case, an angle formed between the straight line parallel to the magnetization direction of the permanent magnet (34) and the magnet centerline (35) of the permanent magnet (34) is θ2 shown in FIG. 4. If the angle is less than or equal to θ2, the magnetic fluxes of the permanent magnets (34) are less likely to interfere with one another. This enables effective use of the magnetic fluxes of the permanent magnets (34).

A portion of the rotor core (31) radially outside the permanent magnets (34) does not have any through holes such as flux barriers. In other words, the portion of the rotor core (31) radially outside the permanent magnets (34) is filled with a core material as viewed in the axial direction.

Each permanent magnet (34) is symmetric with respect to its own magnet centerline (35). The permanent magnets (34) are arranged at equal intervals in the circumferential direction.

Advantages of First Embodiment

According to the rotor (30) of this embodiment, the first magnetic pole (36) is configured to have a smaller amount of harmonic components in the radial flux density distribution on the outer peripheral surface of the rotor core (31), compared to a magnetic pole comprised of a plurality of magnet holes (32) arranged at equal intervals in the circumferential direction and a plurality of permanent magnets (34) having substantially the same magnetic flux and number.

As can be seen, the first magnetic pole (36) is configured to have a smaller amount of harmonic components in the radial flux density distribution on the outer peripheral surface of the rotor core (31). It is therefore possible to reduce core loss that occurs in the stator and increase the torque produced by the rotary electric machine.

Here, to reduce the harmonic components in the radial flux density distribution, the first magnetic pole (36) needs to be configured such that the radial flux density distribution on the outer peripheral surface of the rotor core (31) is close to a sinusoidal waveform.

According to the rotor (30) of this embodiment, a straight line passing through a center of the first magnetic pole (36) and an axis (O) of the rotor (30) is defined as a magnetic pole centerline (37), and a straight line passing through a center of each permanent magnet (34) and the axis (O) of the rotor (30) is defined as a magnet centerline (35), each of straight lines parallel to magnetization directions of the permanent magnets (34) at both circumferential ends of the first magnetic pole (36) is inclined with respect to the magnet centerline (35) of the associated permanent magnet (34), and is inclined, compared to the magnet centerline (35), in a direction toward the magnetic pole centerline (37) of the first magnetic pole (36) as the straight line approaches from the center to a radially outer end of the associated permanent magnet (34), and an angle formed between each of the straight lines parallel to the magnetization directions of the permanent magnets (34) at both circumferential ends of the first magnetic pole (36) and the magnet centerline (35) of the associated permanent magnet (34) is greater than 0° and less than 90°. Thus, the magnetic flux generated by the first magnetic pole (36) including a plurality of permanent magnets (34) concentrates at the center of the first magnetic pole (36). The magnetic flux of each of the permanent magnets (34) at both circumferential ends of the first magnetic pole (36) is less likely to flow into an adjacent one of the magnetic poles (36). Therefore, a short circuit is less likely to occur in the rotor (30). More specifically, the permanent magnets (34) at both circumferential ends of an optional magnetic pole (36) are each located next to a permanent magnet (34) of an adjacent magnetic pole (36) of different polarity. Thus, a short circuit of magnetic fluxes is likely to occur in the rotor (30). To address this, in this embodiment, the straight lines parallel to the magnetization directions of the permanent magnets (34) at both circumferential ends of the magnetic pole (36) are inclined in a predetermined direction. A short circuit of the magnetic fluxes is therefore less likely to occur in the rotor (30). Effective use of the magnetic fluxes of the permanent magnets (34) can increase the torque produced by the rotary electric machine (10) including the rotor (30).

According to the rotor (30) of the present embodiment, each of the straight lines parallel to the magnetization directions of the permanent magnets (34) only at both circumferential ends of the first magnetic pole (36) is inclined with respect to the magnet centerline (35) of the associated permanent magnet (34). Thus, setting the straight lines parallel to the magnetization directions of the permanent magnets (34) only at both circumferential ends of the magnetic pole to be in the direction as described above can effectively increase the torque produced by the rotary electric machine (10) including the rotor (30) and reduce the types of permanent magnets (34) having different easy axes of magnetization. This can reduce the manufacturing cost of the rotor (30).

According to the rotor (30) of the present embodiment, the portion of the rotor core (31) radially outside the permanent magnets (34) is filled with the core material as viewed in the axial direction. Thus, the portion of the rotor core (31) radially outside the permanent magnets (34) more easily withstands the centrifugal force generated by the rotating rotor (30). This is because this portion does not have any air gap such as flux barrier. This can improve the durability of the rotor (30).

According to the rotor (30) of the present embodiment, the permanent magnets (34) are each housed in an associated one of the magnet holes (32) of the rotor core (31). This can substantially prevent the permanent magnets (34) from flying out of the rotating rotor (30).

According to the rotor (30) of the present embodiment, each permanent magnet (34) is symmetric with respect to its own magnet centerline (35). The permanent magnets (34) are supported by elongated portions (hereinafter referred to as the "bridges") of the rotor core (31) between adjacent ones of the permanent magnets (34). Symmetric permanent magnets (34) contribute to evenly distributing loads applied to the bridges due to the centrifugal force. The rotor (30) can thus be suitable for high-speed rotation.

According to the rotor (30) of the present embodiment, the permanent magnets (34) are arranged at equal intervals in the circumferential direction. The absence of extremely large permanent magnets (34) and extremely small permanent magnets (34) reduces the loads carried by the bridges supporting the permanent magnets (34). The rotor (30) can thus be suitable for high-speed rotation.

The rotary electric machine (10) of this embodiment includes the rotor (30) and the stator (20) facing the rotor (30). Thus, the rotary electric machine (10) producing high torque can be provided.

According to the rotary electric machine (10) of this embodiment, the stator (20) includes the driving coils (24) and the supporting coils (25) both wound around the teeth (23) of the stator (20) by concentrated winding. In the case where the coils (24, 25) are wound by concentrated winding, the amount of magnetic flux produced by the permanent magnets (34) and linked with the coils (24, 25) tends to decrease than in the case where the coils (24, 25) are wound by distributed winding. Such concentrated winding strengthens the influence of the magnetic fluxes of the permanent magnets (34) concentrating at the center of the associated magnetic pole (36) as described in this embodiment. This may further increase the torque produced.

The rotary electric machine (10) of this embodiment includes: the rotor (30); and a stator (20) facing the rotor (30), wherein the stator (20) includes a coil (24, 25) wound around a tooth (23) of the stator (20) by concentrated winding, a state where the magnetic pole centerline (37) of the first magnetic pole (36) passes through a circumferential center of the tooth (23) as viewed in an axial direction is defined as a center-aligned state, in the center-aligned state, an angle formed between the magnet centerline (35) of the first magnetic pole (36) and a straight line connecting a center of an outer peripheral surface of each of the permanent magnets (34) at both circumferential ends of the first magnetic pole (36) and an associated end of an inner peripheral surface of the tooth (23) as viewed in the axial direction is defined as θ1, in the center-aligned state, an angle formed between the magnet centerline (35) of the first magnetic pole (36) and a straight line connecting the center of the outer peripheral surface of each of the permanent magnets (34) at both circumferential ends of the first magnetic pole (36) and a center of the inner peripheral surface of the tooth (23) as viewed in the axial direction is defined as θ2, and an angle formed between each of the straight lines parallel to the magnetization directions of the permanent magnets (34) at both circumferential ends of the first magnetic pole (36) and the magnet centerline (35) of the associated permanent magnet (34) ranges from θ1 to θ2. This allows the magnetic fluxes of the permanent magnets (34) to be effectively linked with the associated teeth (23), and can substantially prevent the magnetic fluxes of the permanent magnets (34) from interfering with one another. This can further increase the torque produced by the rotary electric machine (10).

Figure 5:
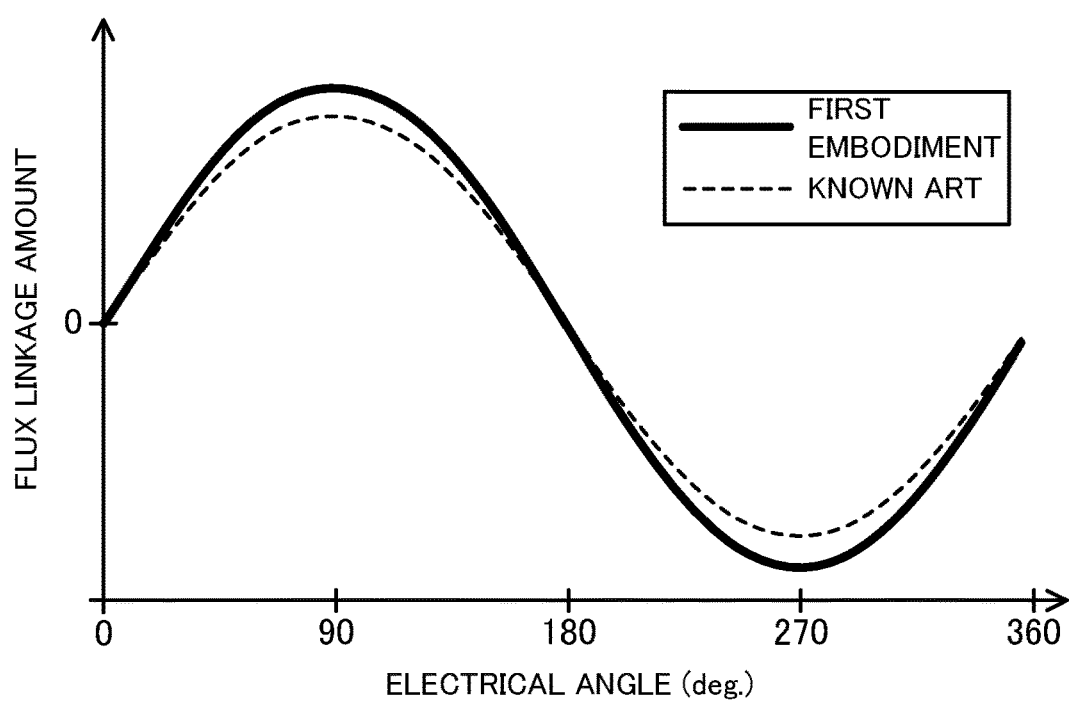
FIG. 5 is a graph showing an amount of the flux linkage of the rotary electric machine according to the first embodiment relative to an amount of the flux linkage of a known rotary electric machine.

The rotary electric machine (10) of this embodiment is configured as a bearingless motor supporting the rotor (30) in a non-contact manner. Here, the inventors of this application have discovered that giving consideration to the magnetization directions of the permanent magnets (34) at both circumferential ends of the magnetic pole (36) as described above provides unexpected advantages such as an increase in fundamental components of the flux linkage of the permanent magnets (34) of the magnetic pole (36) and a reduction in harmonic components thereof. More specifically, as shown in FIG. 5, the flux linkage of each magnetic pole (36) has more fundamental components and less harmonic components than in the case where the permanent magnets (34) are magnetized in the radial direction as in the known art. A comparison between the amount of the flux linkage according to the known art (the broken curve) and the amount of the flux linkage according to the first embodiment (the solid curve) in relation to frequency components, both shown in FIG. 5, shows that the proportion of fifth-order components in the latter flux linkage amount decreases to about 30% of the proportion of fifth-order components in the former flux linkage amount. Reducing the harmonic components as described above can increase the torque produced by the rotary electric machine (10) configured as a bearingless motor, and can increase the supporting force of the rotary electric machine (10) while reducing the supporting force interference.

Second Embodiment

A second embodiment will be described below. A rotary electric machine (10) of this embodiment differs from that of the first embodiment in the number of magnetic poles (36) and the configuration of a stator (20). Thus, differences from the first embodiment will be mainly described below.

Figure 6:
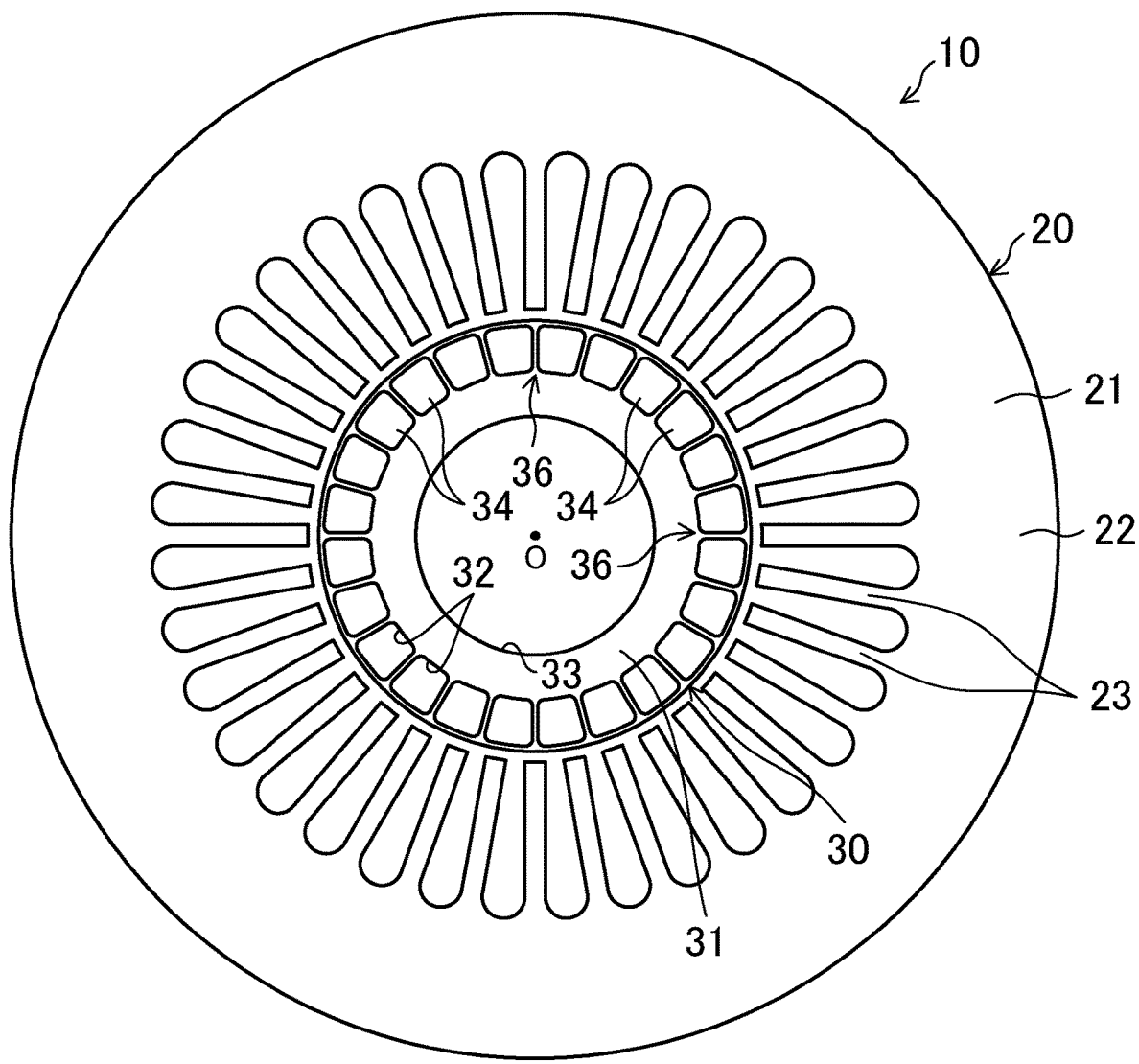
FIG. 6 is a front view illustrating a configuration of a rotary electric machine according to a second embodiment.
Figure 7:
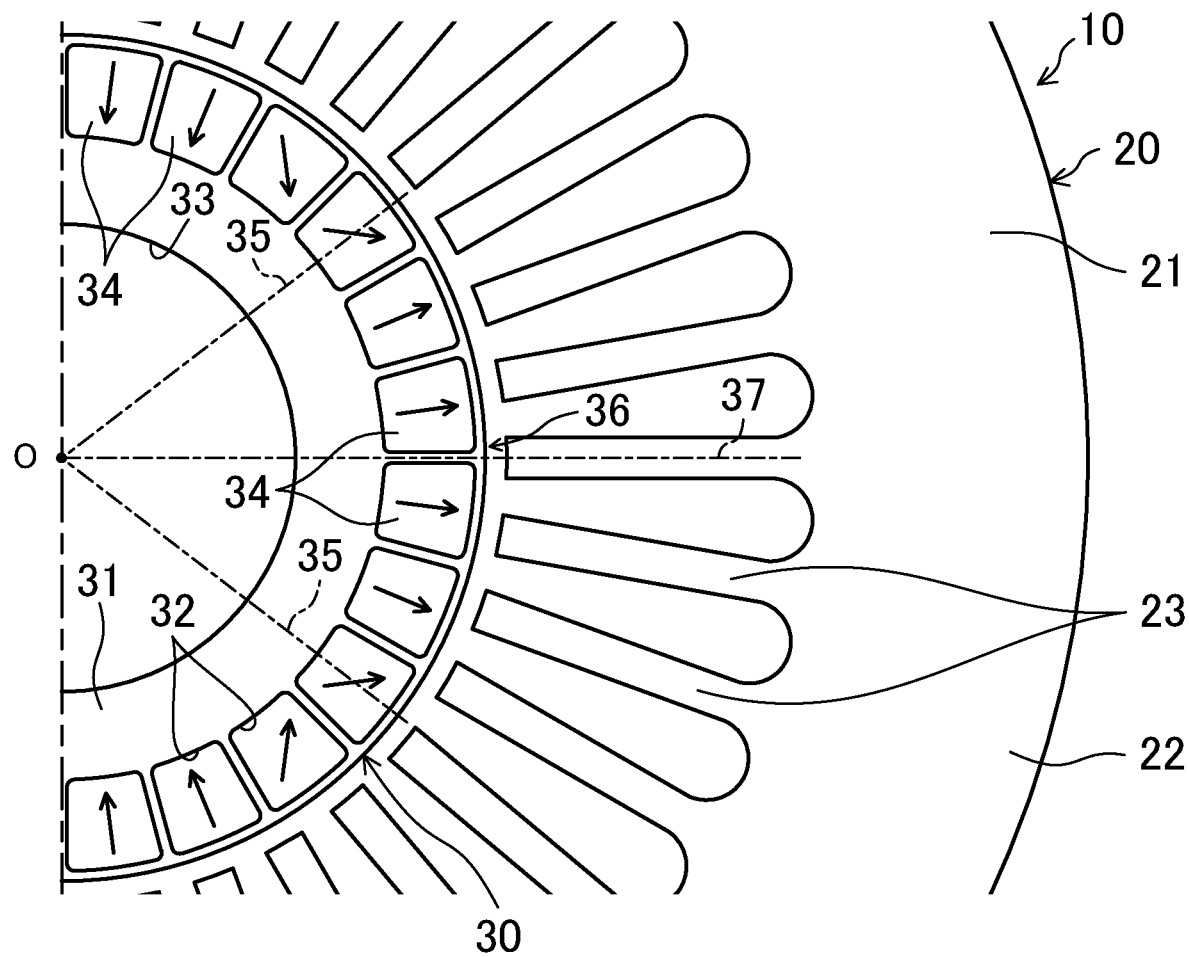
FIG. 7 is an enlarged front view illustrating an essential portion of the rotary electric machine illustrated in FIG. 6.

As illustrated in FIGS. 6 and 7, each magnetic pole (36) of a rotor (30) includes six circumferentially adjacent permanent magnets (34). In FIG. 7, the magnetization directions of the permanent magnets (34) are indicated by arrows.

Each of straight lines parallel to the magnetization directions of the permanent magnets (34) at both circumferential ends of the magnetic pole (36) is inclined with respect to the magnet centerline (35) of the associated permanent magnet (34). Each of the straight lines parallel to the magnetization directions of the permanent magnets (34) at both circumferential ends of the magnetic pole (36) is inclined, compared to the magnet centerline (35) of the associated permanent magnet (34), in a direction toward the magnetic pole centerline (37) of the magnetic pole (36) as the straight line approaches from the center to the radially outer end of the associated permanent magnet (34). In contrast, each of the straight lines parallel to the magnetization directions of four intermediate permanent magnets (34) of the magnetic pole (36) is substantially parallel to the magnet centerline (not shown) of the associated permanent magnet (34). The straight lines parallel to the magnetization directions of the four intermediate permanent magnets (34) of the magnetic pole (36) may be inclined with respect to the magnet centerlines of the respective permanent magnets (34).

Driving coils and supporting coils (both not shown) are wound around a plurality of teeth (23) of a stator (20) by distributed winding.

Advantages of Second Embodiment

The rotor (30) and rotary electric machine (10) of this embodiment also provide the same advantages as those of the first embodiment.

Variations of First and Second Embodiments

The embodiments described above may be modified as follows.

Figure 8:
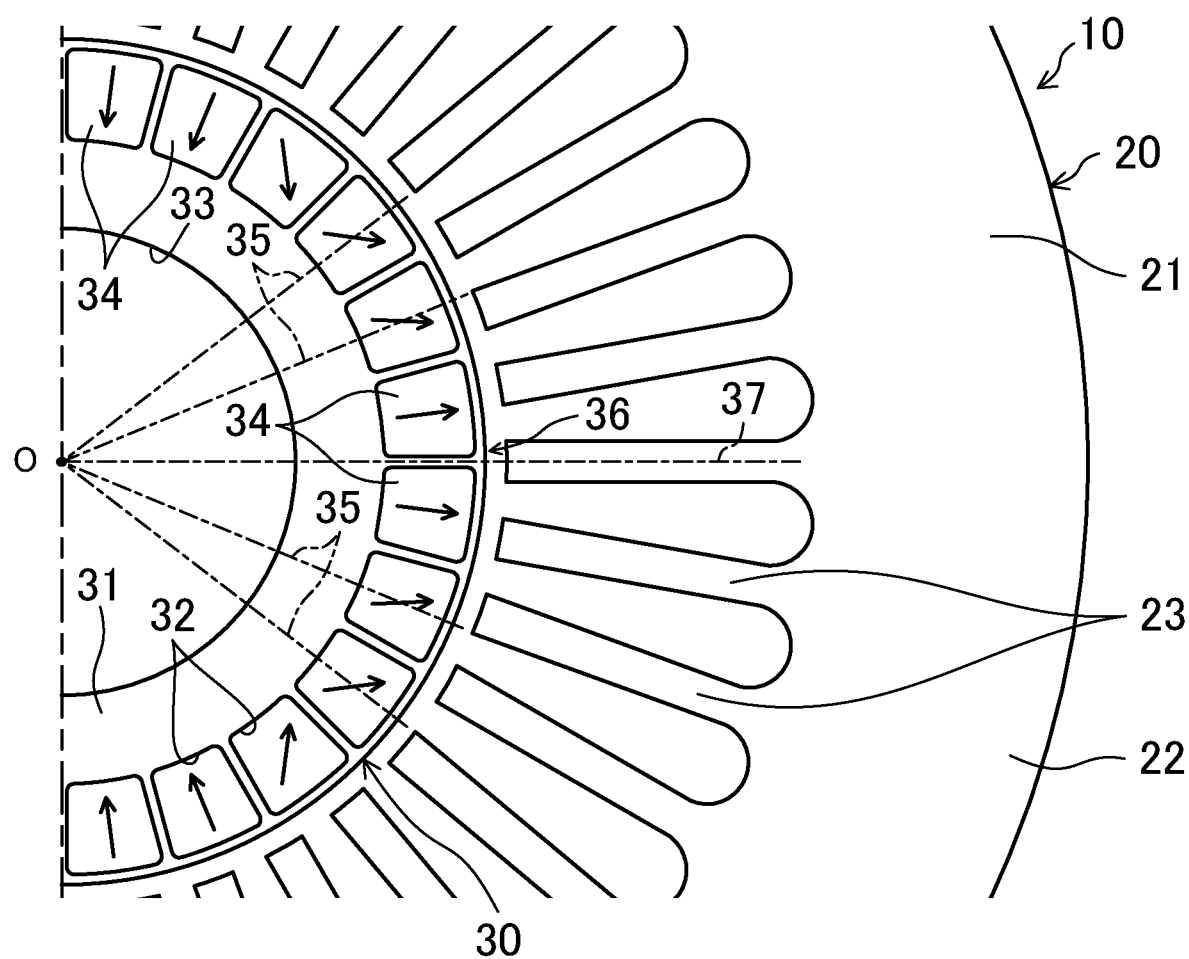
FIG. 8 is an enlarged front view illustrating an essential portion of a rotary electric machine according to a variation of the first and second embodiments.

In the first and second embodiments, each of the straight lines parallel to the magnetization directions of only the permanent magnets (34) at both circumferential ends of the magnetic pole (36) is inclined with respect to the magnet centerline (35) of the associated permanent magnet (34). However, straight lines parallel to the magnetization directions of the other permanent magnets (34) of the same magnetic pole (36) may also be inclined with respect to the magnet centerlines (35). For example, straight lines parallel to the magnetization directions of not only the permanent magnets (34) at both circumferential ends, but also the permanent magnets (34) adjacent to the permanent magnets (34) at both circumferential ends may be inclined with respect to the respective magnet centerlines (35) (see FIG. 8). Alternatively, straight lines parallel to the magnetization directions of all the permanent magnets (34) may be inclined with respect to the respective magnet centerlines (35). In each magnetic pole (36), in one preferred embodiment, the angles of inclination of straight lines parallel to the magnetization directions of the permanent magnets (34) with respect to the magnetic pole centerline (37) decrease from both circumferential ends toward the circumferential center of the magnetic pole (36).

In the first and second embodiments, the angle formed between each of the straight lines parallel to the magnetization directions of the permanent magnets (34) at both circumferential ends of the magnetic pole (36) and the magnet centerline (35) of the associated permanent magnet (34) ranges preferably from θ1 to θ2 shown in FIG. 4. However, the angle formed between each of the straight lines parallel to the magnetization directions of the permanent magnets (34) at both circumferential ends of each magnetic pole (36) and the magnet centerline (35) of the associated permanent magnet (34) may be any angle greater than 0° and less than 90°. In the latter case, too, a short circuit of the magnetic fluxes of the permanent magnets (34) is less likely to occur in the rotor (30), and the torque produced by the rotary electric machine (10) including the rotor (30) can be increased.

Third Embodiment

A third embodiment will be described below.

Figure 9:
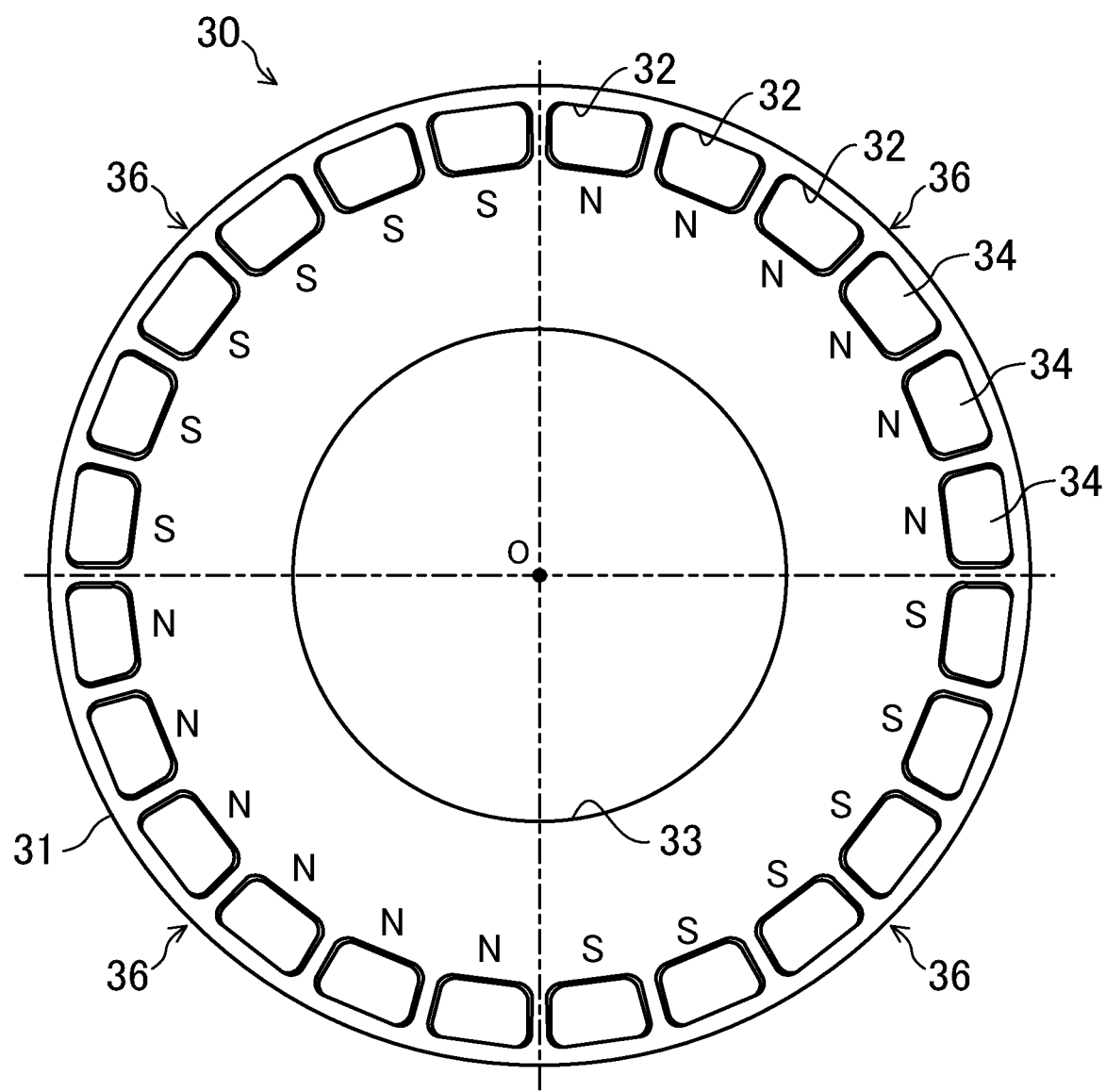
FIG. 9 is a front view illustrating a configuration of a rotor according to a third embodiment.

As illustrated in FIG. 9, a rotor (30) has four first magnetic poles (36). The first magnetic poles (36) each include six magnet holes (32) arranged next to each other in the circumferential direction, and six permanent magnets (34) housed in the respective magnet holes (32).

Figure 10:
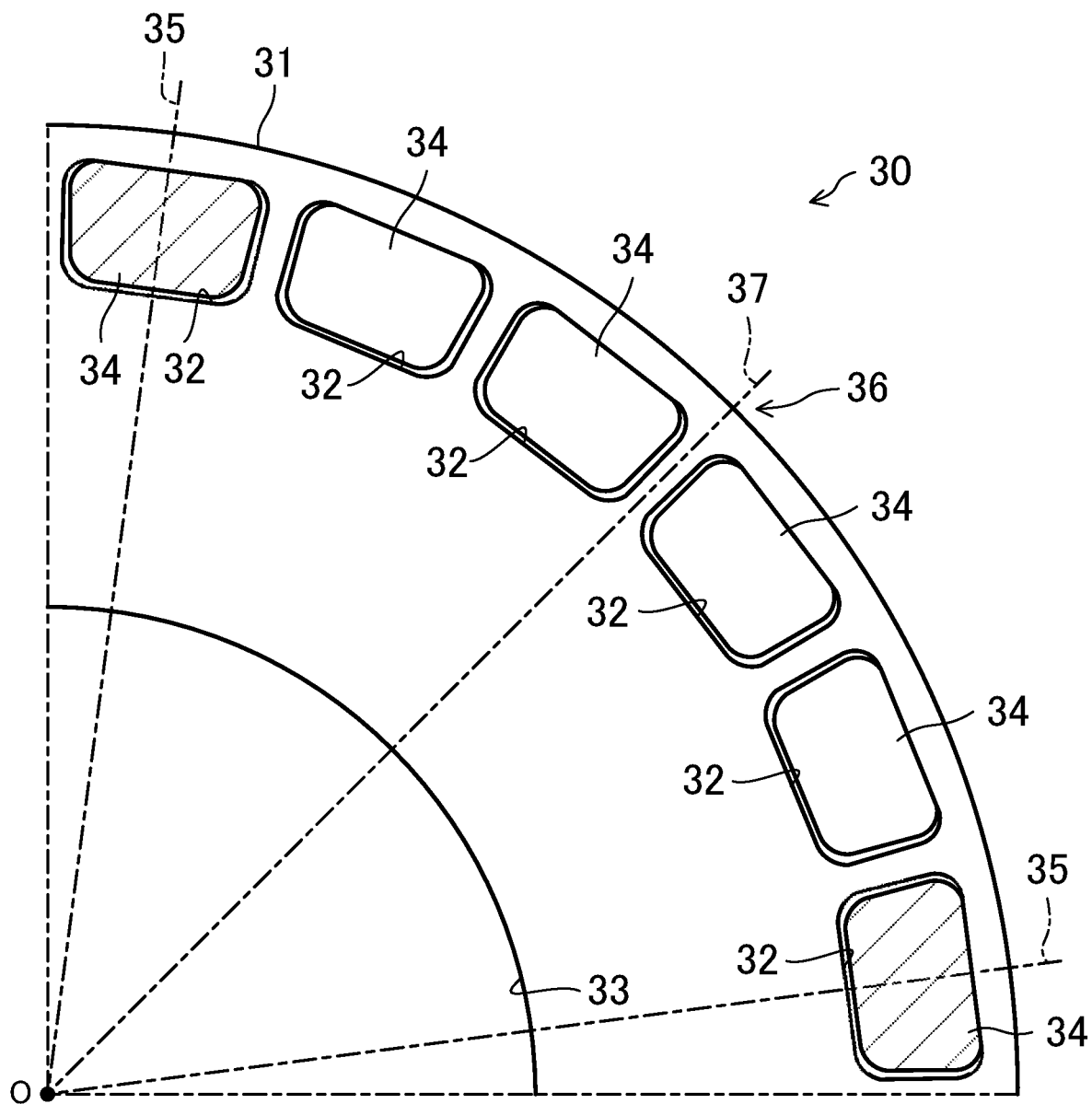
FIG. 10 is an enlarged front view illustrating an essential portion of the rotor.

As illustrated in FIG. 10, at least one of the permanent magnets (34) of each first magnetic pole (36) has a higher residual flux density than the permanent magnets (34) at both circumferential ends of the first magnetic pole (36). Specifically, the permanent magnets (34) at both circumferential ends of the first magnetic pole (36) (hatched in FIG. 10) have a relatively lower residual flux density than the other permanent magnets (34).

On the outer peripheral surface of the rotor core (31), the magnetic flux is higher in a region in the radial direction of the magnet holes (32) where the permanent magnets (34) having higher residual flux density are placed than in a region corresponding to both circumferential ends of the first magnetic pole (36).

Changes in the radial flux density distribution on the outer peripheral surface of the rotor core (31) will be described with reference to FIGS. 11 and 12.

Figure 11:
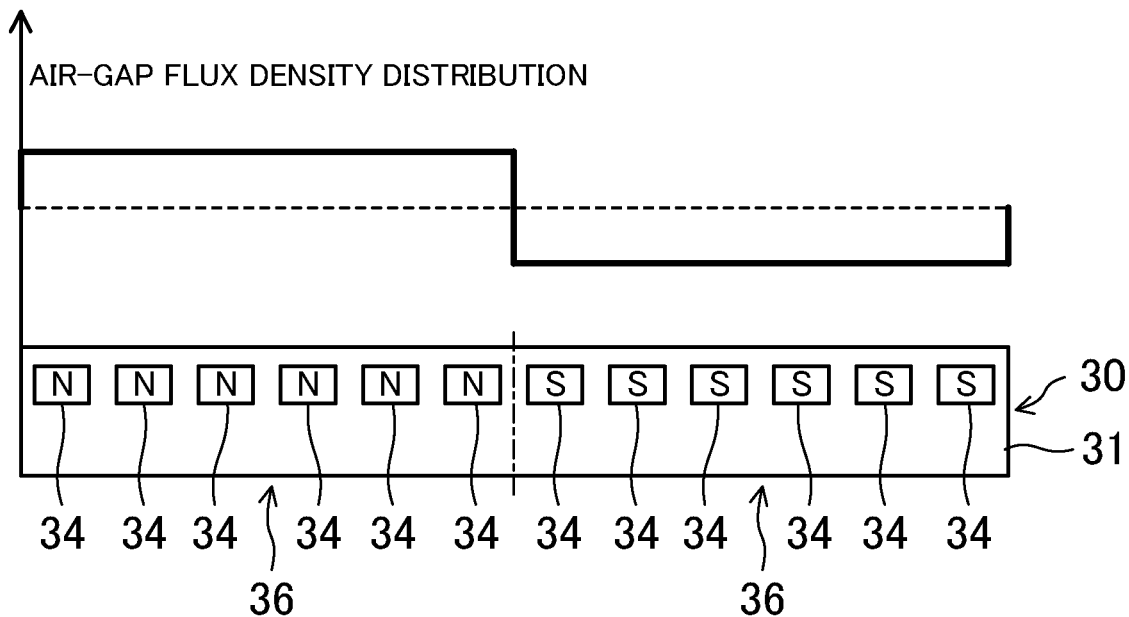
FIG. 11 is a graph showing a radial flux density distribution on a known rotor.

FIG. 11 is a graph showing a radial flux density distribution on a known rotor (30). In the known rotor (30), first magnetic poles (36) forming the north and south poles each have a plurality of magnet holes (32) arranged at equal intervals in the circumferential direction, and a plurality of permanent magnets (34) having substantially the same magnetic flux and number.

As shown in FIG. 11, the air-gap flux density distribution on the known rotor (30) has a rectangular waveform. Thus, in the known rotor (30), the core loss that occurs in a stator (20) due to harmonic components may increase.

Figure 12:
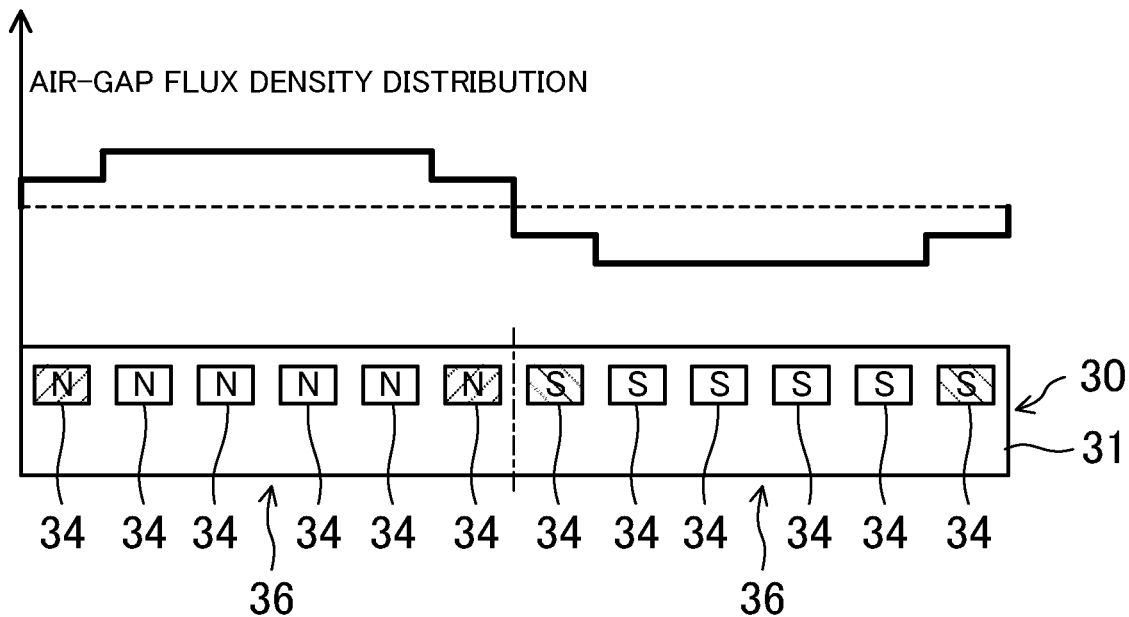
FIG. 12 is a graph showing a radial flux density distribution on a rotor according to the third embodiment.

FIG. 12 is a graph showing a radial flux density distribution on the rotor according to this embodiment. In the rotor (30) according to this embodiment, the first magnetic poles (36) forming the north and south poles each have the magnet holes (32) arranged at equal intervals in the circumferential direction. The permanent magnets (34) at both circumferential ends of the first magnetic pole (36) have a relatively lower residual flux density than the other permanent magnets (34).

As shown in FIG. 12, the air-gap flux density distribution of the rotor (30) according to this embodiment has a waveform closer to a sinusoidal waveform than to a rectangular waveform. This allows the radial flux density distribution on the outer peripheral surface of the rotor core (31) to have a waveform closer to a sinusoidal waveform, and can reduce harmonic components in the radial flux density distribution.

In this embodiment, the permanent magnets (34) at both circumferential ends of the first magnetic pole (36) have a relatively lower residual flux density than the other permanent magnets (34). However, this feature is merely an example. For example, three or more types of permanent magnets (34) having different residual flux densities may be used to increase the residual flux density from both circumferential ends toward the circumferential center of the first magnetic pole (36).

Fourth Embodiment

A fourth embodiment will be described below.

Figure 13:
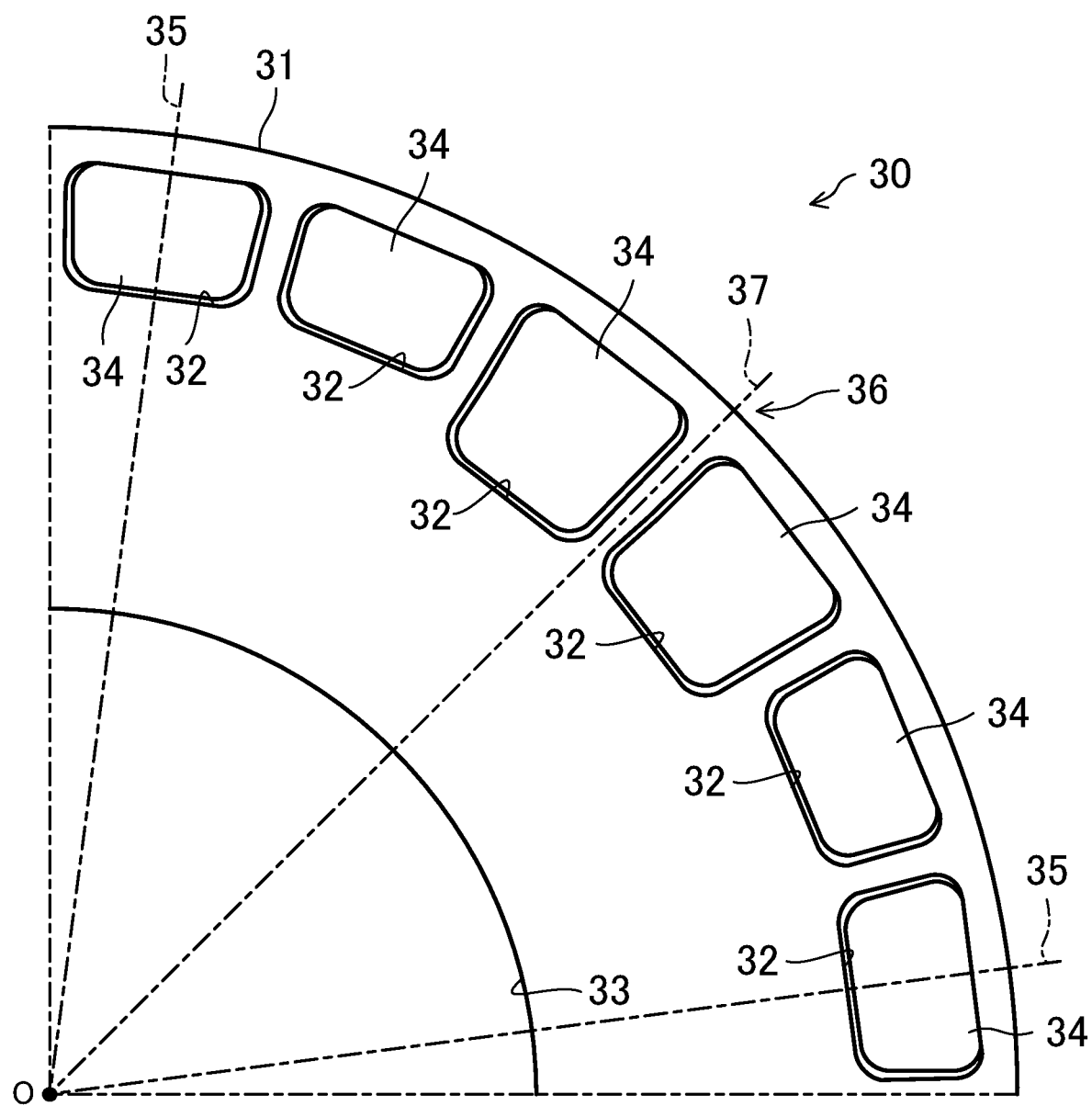
FIG. 13 is an enlarged front view illustrating an essential portion of a rotor according to a fourth embodiment.

As illustrated in FIG. 13, a rotor (30) includes a first magnetic pole (36) having six magnet holes (32) arranged next to each other in the circumferential direction and six permanent magnets (34) housed in the respective magnet holes (32).

At least one of the permanent magnets (34) of the first magnetic pole (36) has a greater magnet thickness than the permanent magnets (34) at both circumferential ends of the first magnetic pole (36). Here, the magnet thickness refers to the average radial length of the permanent magnet (34). Specifically, among the six permanent magnets (34) of the first magnetic pole (36), two circumferentially intermediate permanent magnets (34) have a relatively greater magnet thickness than the other permanent magnets (34). Here, on the outer peripheral surface of the rotor core (31), the magnetic flux increases in a region in the radial direction of the magnet holes (32) where the permanent magnets (34) having a greater magnet thickness are placed.

This allows the radial flux density distribution on the outer peripheral surface of the rotor core (31) to have a waveform closer to a sinusoidal waveform, and can reduce harmonic components in the radial flux density distribution.

Instead of the permanent magnets (34) having a different magnet thickness, permanent magnets (34) having a different magnet width may be used. The magnet width refers to the average circumferential length of the permanent magnet (34). In this case, among the six permanent magnets (34) of the first magnetic pole (36), two circumferentially intermediate permanent magnets (34) may have a relatively greater magnet width than the other permanent magnets (34).

Fifth Embodiment

A fifth embodiment will be described below.

Figure 14:
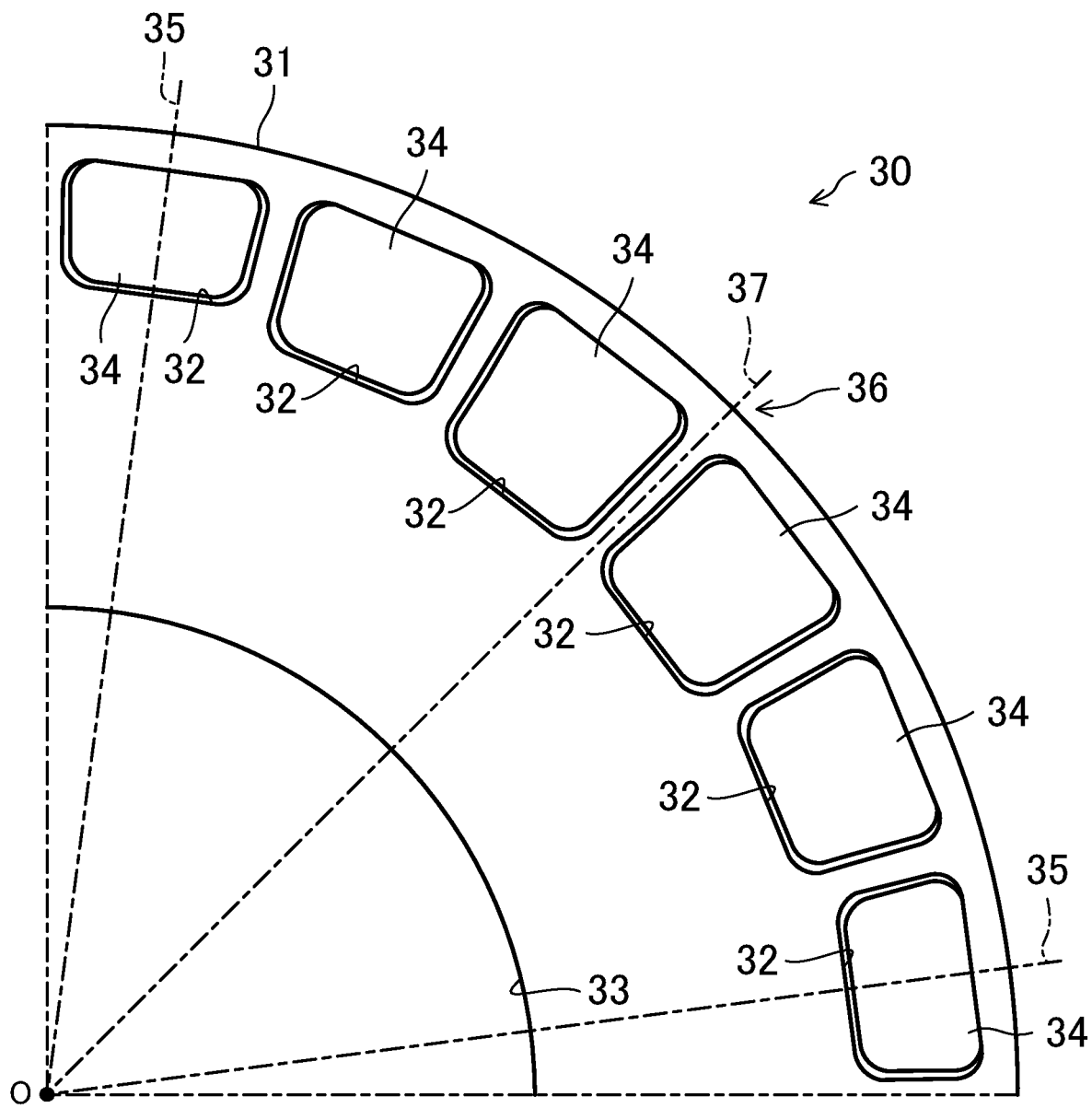
FIG. 14 is an enlarged front view illustrating an essential portion of a rotor according to a fifth embodiment.

As illustrated in FIG. 14, a rotor (30) includes a first magnetic pole (36) having six magnet holes (32) arranged next to each other in the circumferential direction and six permanent magnets (34) housed in the respective magnet holes (32). The first magnetic pole (36) includes three types of permanent magnets (34) having different magnet thicknesses.

The permanent magnets (34) of the first magnetic pole (36) have magnet thicknesses that increase from both circumferential ends toward the circumferential center of the first magnetic pole (36). Here, on the outer peripheral surface of the rotor core (31), the magnetic flux increases in a region in the radial direction of the magnet holes (32) where the permanent magnets (34) having a greater magnet thickness are placed.

This allows the radial flux density distribution on the outer peripheral surface of the rotor core (31) to have a waveform closer to a sinusoidal waveform, and can reduce harmonic components in the radial flux density distribution.

Instead of the permanent magnets (34) having a different magnet thickness, permanent magnets (34) having a different magnet width may be used. In this case, the permanent magnets (34) of the first magnetic pole (36) have magnet widths that increase from both circumferential ends toward the circumferential center of the first magnetic pole (36).

Sixth Embodiment

A sixth embodiment will be described below.

Figure 15:
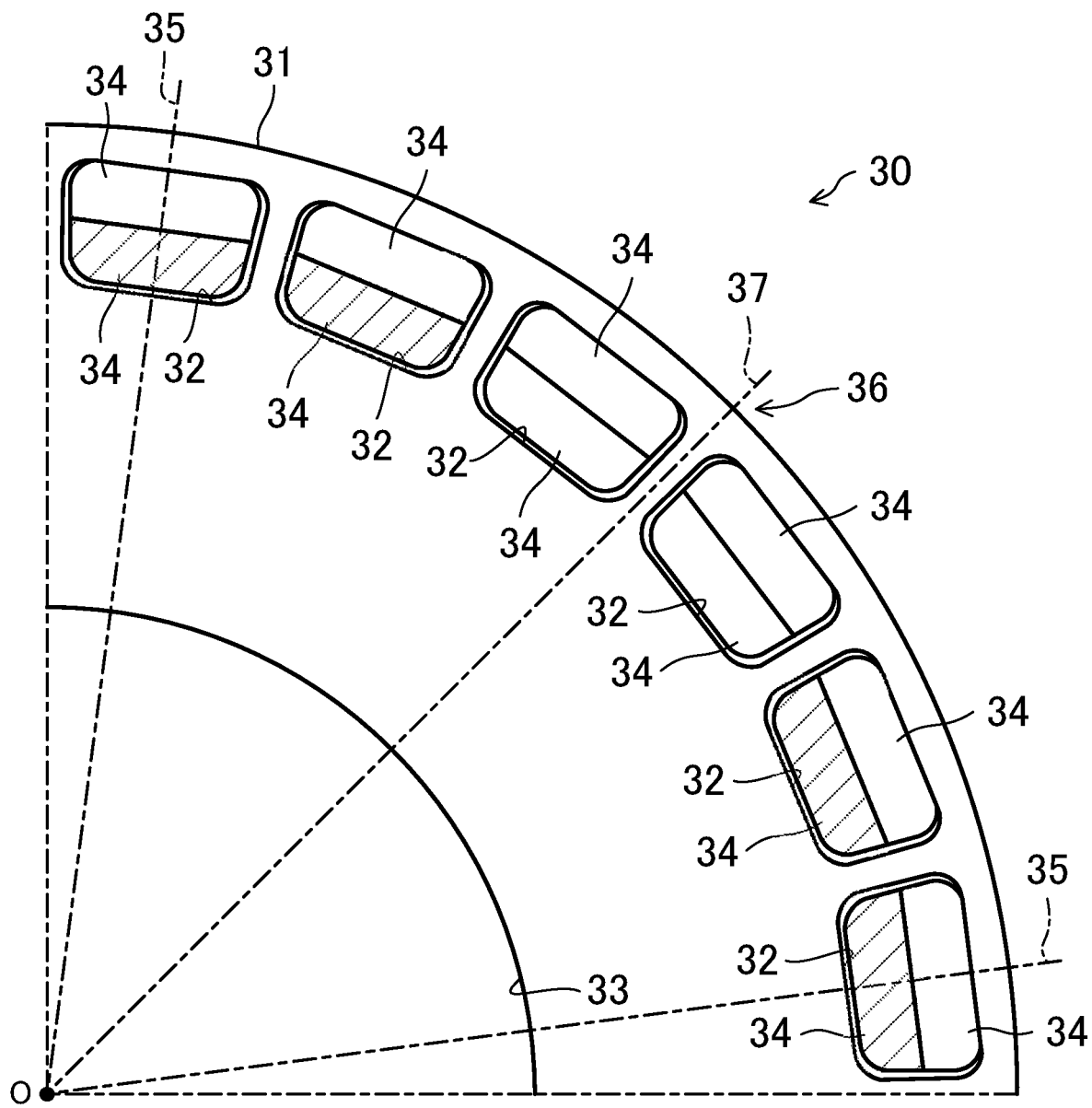
FIG. 15 is an enlarged front view illustrating an essential portion of a rotor according to a sixth embodiment.

As illustrated in FIG. 15, a rotor (30) includes a first magnetic pole (36) having six magnet holes (32) arranged next to each other in the circumferential direction and a plurality of permanent magnets (34), two or more of which are housed in each magnet hole (32). In the example illustrated in FIG. 15, each magnet hole (32) includes two permanent magnets (34) arranged side by side in the radial direction of the rotor (30).

At least one of the magnet holes (32) of the first magnetic pole (36) houses a permanent magnet (34) having an average residual flux density higher than that of the permanent magnets (34) housed in the magnet holes (32) at both circumferential ends of the first magnetic pole (36).

Specifically, among the six magnet holes (32) of the first magnetic pole (36), each of the two circumferentially intermediate magnet holes (32) houses two permanent magnets (34) having the same residual flux density. In contrast, each of the remaining four magnet holes (32) houses one permanent magnet (34) having the same residual flux density as the two circumferentially intermediate permanent magnets (34), and another permanent magnet (34) (hatched in FIG. 15) having a lower residual flux density than the one permanent magnet (34).

The two permanent magnets (34) housed in each of the two circumferentially intermediate magnet holes of the first magnetic pole (36) have a relatively higher average residual flux density than the two permanent magnets (34) housed in each of the other four magnet holes (32). Here, on the outer peripheral surface of the rotor core (31), the magnetic flux increases in a region in the radial direction of the magnet holes (32) where the permanent magnets (34) having a higher average residual flux density are placed.

This allows the radial flux density distribution on the outer peripheral surface of the rotor core (31) to have a waveform closer to a sinusoidal waveform, and can reduce harmonic components in the radial flux density distribution.

In this embodiment, two permanent magnets (34) are housed in one magnet hole (32). However, this feature is merely an example. For example, three or more permanent magnets (34) may be housed in each of the circumferentially intermediate magnet holes (32) of the first magnetic pole (36) to relatively increase the average residual flux density. Alternatively, only one permanent magnet (34) may be housed in each of the magnet holes (32) at both circumferential ends of the first magnetic pole (36) to relatively reduce the average residual flux density.

Seventh Embodiment

A seventh embodiment will be described below.

Figure 16:
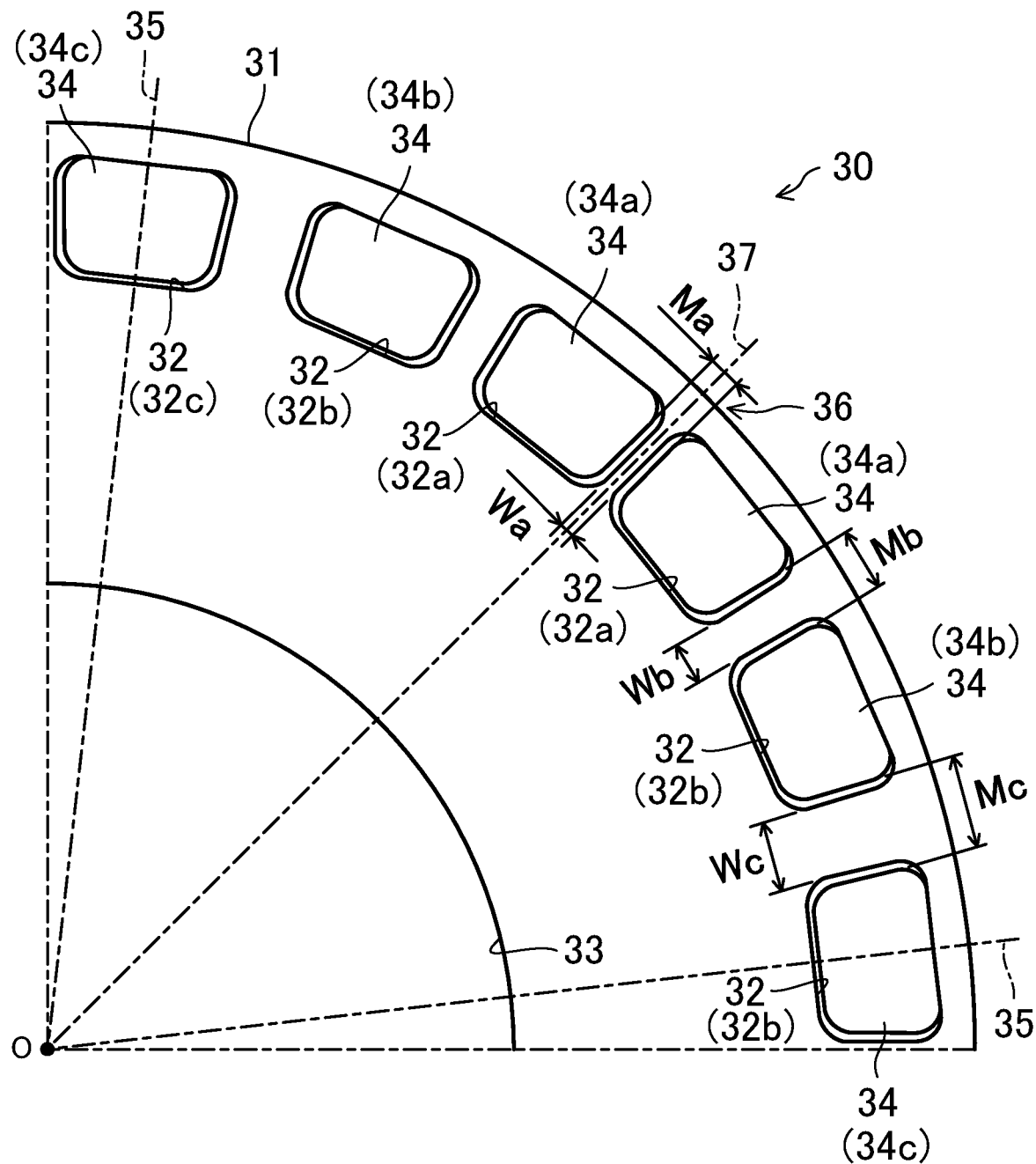
FIG. 16 is an enlarged front view illustrating an essential portion of a rotor according to a seventh embodiment.

As illustrated in FIG. 16, a rotor (30) includes a first magnetic pole (36) having six magnet holes (32) arranged next to each other in the circumferential direction and six permanent magnets (34) housed in the respective magnet holes (32). The first magnetic pole (36) includes a region between adjacent ones of the permanent magnets (34), the region having a circumferential distance shorter than a circumferential distance between each of the permanent magnets (34) at circumferential ends of the first magnetic pole (36) and the permanent magnet (34) adjacent thereto.

Specifically, the magnet holes (32) include a first magnet hole (32a) and a second magnet hole (32b) adjacent to each other, and a third magnet hole (32c) adjacent to the second magnet hole (32b). The first magnet hole (32a) is a circumferentially intermediate magnet hole (32) of the first magnetic pole (36). The third magnet hole (32c) is a magnet hole (32) arranged at each of both circumferential ends of the first magnetic pole (36). The second magnet hole (32b) is a magnet hole (32) arranged between the first magnet hole (32a) and the third magnet hole (32c). The first magnet hole (32a), the second magnet hole (32b), and the third magnet hole (32c) have substantially the same circumferential dimension.

The first magnet hole (32a) houses a first permanent magnet (34a). The second magnet hole (32b) houses a second permanent magnet (34b). The third magnet hole (32c) houses a third permanent magnet (34c). The first permanent magnet (34a), the second permanent magnet (34b), and the third permanent magnet (34c) have substantially the same magnet width.

The circumferential distance Ma between the first permanent magnets (34a) adjacent to each other at the circumferential center of the first magnetic pole (36) is shorter than the circumferential distance Mb between the first permanent magnet (34a) and the second permanent magnet (34b). The circumferential distance Mb between the first permanent magnet (34a) and the second permanent magnet (34b) is shorter than the circumferential distance Mc between the second permanent magnet (34b) and the third permanent magnet (34c). As can be seen, the circumferential distance between adjacent ones of the permanent magnets (34) of the first magnetic pole (36) decreases from both circumferential ends toward the circumferential center of the first magnetic pole (36).

A circumferential dimension Wa of a portion made of core material between the first magnet holes (32a) adjacent to each other is smaller than a circumferential dimension Wb of a portion made of core material between the first magnet hole (32a) and the second magnet hole (32b). The circumferential dimension Wb of the portion made of core material between the first magnet hole (32a) and the second magnet hole (32b) is smaller than a circumferential dimension Wc of a portion made of core material between the second magnet hole (32b) and the third magnet hole (32c).

Here, on the outer peripheral surface of the rotor core (31), the magnetic flux increases in a region in the radial direction of the magnet holes (32) for the adjacent permanent magnets (34) between which the circumferential distance is shorter.

This allows the radial flux density distribution on the outer peripheral surface of the rotor core (31) to have a waveform closer to a sinusoidal waveform, and can reduce harmonic components in the radial flux density distribution.

Eighth Embodiment

An eighth embodiment will be described below. In the following description, the same reference characters designate the same components as those of the seventh embodiment, and the description is focused only on the difference.

Figure 17:
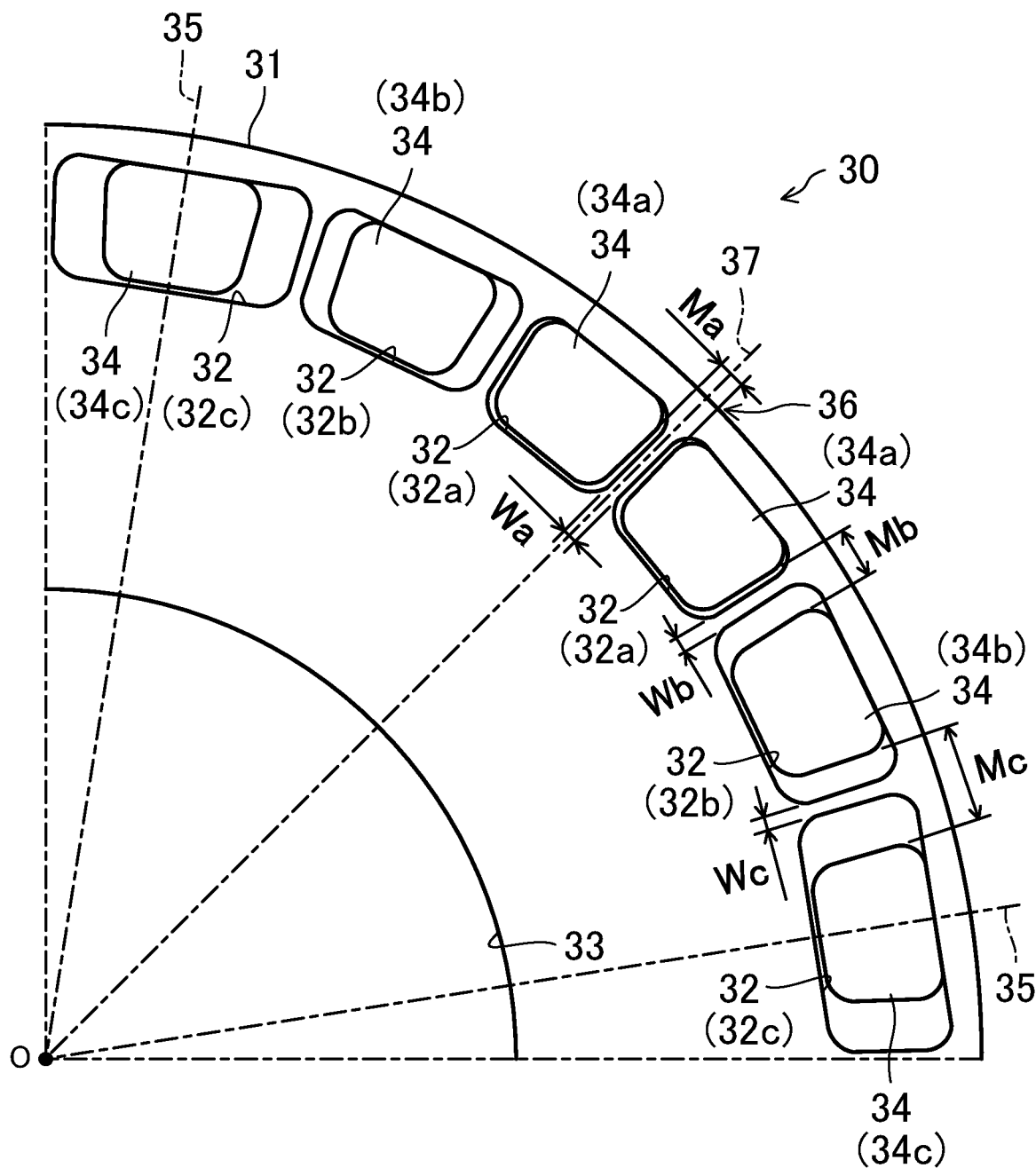
FIG. 17 is an enlarged front view illustrating an essential portion of a rotor according to an eighth embodiment.

As illustrated in FIG. 17, a rotor (30) includes a first magnetic pole (36) having six magnet holes (32) arranged next to each other in the circumferential direction and six permanent magnets (34) housed in the respective magnet holes (32).

The first magnet hole (32a) houses a first permanent magnet (34a). The second magnet hole (32b) houses a second permanent magnet (34b). The third magnet hole (32c) houses a third permanent magnet (34c). The first permanent magnet (34a), the second permanent magnet (34b), and the third permanent magnet (34c) have substantially the same magnet width.

The circumferential dimensions of the magnet holes (32) of the first magnetic pole (36) increase in the following order: the first magnet hole (32a); the second magnet hole (32b); and the third magnet hole (32c).

In the rotor core (31), portions made of core material between adjacent ones of the magnet holes (32) have the same circumferential dimension.

Specifically, a circumferential dimension Wa of a portion made of core material between the first magnet holes (32a) adjacent to each other is substantially equal to a circumferential dimension Wb of a portion made of core material between the first magnet hole (32a) and the second magnet hole (32b). The circumferential dimension Wb of the portion made of core material between the first magnet hole (32a) and the second magnet hole (32b) is substantially equal to a circumferential dimension Wc of a portion made of core material between the second magnet hole (32b) and the third magnet hole (32c).

The circumferential distance Ma between the first permanent magnets (34a) adjacent to each other at the circumferential center of the first magnetic pole (36) is shorter than the circumferential distance Mb between the first permanent magnet (34*a*) and the second permanent magnet (34*b*). The circumferential distance Mb between the first permanent magnet (34*a*) and the second permanent magnet (34*b*) is shorter than the circumferential distance Mc between the second permanent magnet (34*b*) and the third permanent magnet (34*c*). As can be seen, the circumferential distance between adjacent ones of the permanent magnets (34) of the first magnetic pole (36) decreases from both circumferential ends toward the circumferential center of the first magnetic pole (36).

Here, on the outer peripheral surface of the rotor core (31), the magnetic flux increases in a region in the radial direction of the magnet holes (32) for the adjacent permanent magnets (34) between which the circumferential distance is shorter.

This allows the radial flux density distribution on the outer peripheral surface of the rotor core (31) to have a waveform closer to a sinusoidal waveform, and can reduce harmonic components in the radial flux density distribution.

Other Embodiments

The embodiments described above may be modified as follows.

In each of the foregoing embodiments, each permanent magnet (34) is symmetric with respect to its own magnet centerline (35). However, the permanent magnet (34) may be asymmetric with respect to its own magnet centerline (35). For example, the permanent magnet (34) may have a recess only at its one circumferential end to prevent assembly errors.

In each of the foregoing embodiments, every magnetic pole (36) includes a plurality of permanent magnets (34). However, only some of the magnetic poles (36) may include a plurality of permanent magnets (34).

In each of the foregoing embodiments, the rotor (30) is a BPM rotor, but may be any other type of rotor. For example, the rotor (30) may be a surface permanent magnet (SPM) rotor, an inset permanent magnet rotor, or a consequent pole rotor.

In each of the foregoing embodiments, the driving coils (24) and the supporting coils (25) are wound around the stator (20), but shared coils having the functions of both the driving coils (24) and the supporting coils (25) may be wound around the stator (20).

In each of the foregoing embodiments, the rotary electric machine (10) is configured as a bearingless motor, but may be configured as, for example, an electric motor or a generator.

While the embodiments and variations have been described above, it will be understood that various changes in form and details can be made without departing from the spirit and scope of the claims. The above embodiments and variations may be appropriately combined or replaced as long as the functions of the target of the present disclosure are not impaired. In addition, the expressions of "first," "second," and "third" in the specification and claims are used to distinguish the terms to which these expressions are given, and do not limit the number and order of the terms.

As can be seen from the foregoing description, the present disclosure is useful for a rotor and a rotary electric machine.

The invention claimed is:

1. A rotor comprising:
a rotor core having a plurality of magnetic poles,
at least one of the magnetic poles including a first magnetic pole, the first magnetic pole having
four or more magnet holes arranged in a circumferential direction and
a plurality of permanent magnets each housed in a corresponding one of the magnet holes,
a portion of the rotor core between adjacent ones of the magnet holes having a region extending in a radial direction,
a maximum radial dimension of each of the magnet holes being greater than a minimum radial dimension of a portion of the rotor core between a radially outer surface of the magnet hole and an outer peripheral surface of the rotor core, and
the first magnetic pole being configured to have a smaller amount of harmonic components in a radial flux density distribution on the outer peripheral surface of the rotor core, compared to a magnetic pole having a plurality of magnet holes arranged at equal intervals in the circumferential direction and a plurality of permanent magnets having substantially the same magnetic flux and number
a straight line passing through a center of the first magnetic pole and an axis of the rotor being defined as a magnetic pole centerline, and a straight line passing through a center of each permanent magnet and the axis of the rotor is defined as a magnet centerline,
each of a plurality of straight lines parallel to magnetization directions of the permanent magnets at both circumferential ends of the first magnetic pole being inclined with respect to the magnet centerline of the associated permanent magnet, and being inclined, compared to the magnet centerline, in a direction toward the magnetic pole centerline of the first magnetic pole as the straight line approaches from the center to a radially outer end of the associated permanent magnet, and
an angle formed between each of the plurality of straight lines parallel to the magnetization directions of the permanent magnets at both circumferential ends of the first magnetic pole and the magnet centerline of the associated permanent magnet being greater than 0° and less than 90°,
each of the plurality of straight lines parallel to the magnetization directions of the permanent magnets only at both circumferential ends of the first magnetic pole being inclined with respect to the magnet centerline of the associated permanent magnet.

2. The rotor according to claim 1, wherein
a portion of the rotor core radially outside the permanent magnets is filled with a core material as viewed along an axial direction.

3. The rotor according to claim 1, wherein
each of the permanent magnets is housed in an associated one of the magnet holes of the rotor core.

4. The rotor according to claim 1, wherein
a straight line passing through a center of each permanent magnet and an axis of the rotor is a magnet centerline, and
each permanent magnet is symmetric with respect to its own magnet centerline.

5. The rotor according to claim 1, wherein
the permanent magnets are arranged at equal intervals in the circumferential direction.

6. The rotor according to claim 1, wherein
the permanent magnets are different from one another in at least a magnet width, a magnet thickness, a residual flux density, or a number of the permanent magnets to be housed in each magnet hole, and the first magnetic pole has, on the outer peripheral surface of the rotor core, a region having a higher magnetic flux than regions in the radial direction of the magnet holes at both circumferential ends of the first magnetic pole.

7. The rotor according to claim 6, wherein
at least one of the permanent magnets of the first magnetic pole has a higher residual flux density than the permanent magnets at both circumferential ends of the first magnetic pole.

8. The rotor according to claim 6, wherein
at least one of the permanent magnets of the first magnetic pole has a greater magnet thickness than the permanent magnets at both circumferential ends of the first magnetic pole.

9. The rotor according to claim 6, wherein
the magnetic flux of the first magnetic pole increases from both circumferential ends toward a circumferential center of the first magnetic pole.

10. The rotor according to claim 6, wherein
at least one of the permanent magnets of the first magnetic pole has a greater magnet width than the permanent magnets at both circumferential ends of the first magnetic pole.

11. The rotor according to claim 6, wherein
two or more of the permanent magnets are housed in each magnet hole, and
at least one of the magnet holes in the first magnetic pole houses two or more of the permanent magnets having an average residual flux density higher than the permanent magnets housed in the magnet holes at both circumferential ends of the first magnetic pole.

12. The rotor according to claim 1, wherein
the first magnetic pole has four or more magnet holes arranged in the circumferential direction, and each of a plurality of permanent magnets is housed in a corresponding one of the magnet holes, and
the first magnetic pole includes a region between adjacent ones of the permanent magnets, the region has a circumferential distance shorter than a circumferential distance between each of the permanent magnets at circumferential ends of the first magnetic pole and the permanent magnet adjacent thereto.

13. The rotor according to claim 12, wherein
the circumferential distance between adjacent ones of the permanent magnets of the first magnetic pole decreases from both circumferential ends toward a circumferential center of the first magnetic pole.

14. The rotor according to claim 12, wherein
the magnet holes include a first and second magnet holes adjacent to each other, and a third magnet hole adjacent to the second magnet hole,
the permanent magnets include a first permanent magnet housed in the first magnet hole, a second permanent magnet housed in the second magnet hole, and a third permanent magnet housed in the third magnet hole,
a circumferential distance between the first permanent magnet and the second permanent magnet is shorter than a circumferential distance between the second permanent magnet and the third permanent magnet, and
a circumferential dimension of a portion made of a core material between the first magnet hole and the second magnet hole is smaller than a circumferential dimension of a portion made of the core material between the second magnet hole and the third magnet hole.

15. The rotor according to claim 12, wherein
in the rotor core, portions made of a core material between adjacent ones of the magnet holes are equal in circumferential dimension.

16. A rotary electric machine including the rotor according to claim 1, the rotary electric machine further comprising:
a stator facing the rotor.

17. The rotary electric machine according to claim 16, wherein
the stator includes a coil wound around a tooth of the stator by concentrated winding.

18. A rotary electric machine including the rotor according to claim 1, the rotary electric machine further comprising:
a stator facing the rotor, the stator including a coil wound around a tooth of the stator by concentrated winding,
a straight line passing through a center of the first magnetic pole and an axis of the rotor being a magnetic pole centerline, and a straight line passing through a center of each permanent magnet and the axis of the rotor being a magnet centerline,
a state in which the magnetic pole centerline of the first magnetic pole passes through a circumferential center of the tooth as viewed along an axial direction being a center-aligned state,
in the center-aligned state, an angle θ1 being formed between
the magnet centerline of the permanent magnet and
a straight line connecting a center of an outer peripheral surface of each of the permanent magnets at both circumferential ends of the first magnetic pole and an associated end of an inner peripheral surface of the tooth as viewed along the axial direction,
in the center-aligned state, an angle θ2 being formed between
the magnet centerline of the permanent magnet and
a straight line connecting the center of the outer peripheral surface of each of the permanent magnets at both circumferential ends of the first magnetic pole and a center of the inner peripheral surface of the tooth as viewed along the axial direction, and
an angle formed between each of the straight lines parallel to the magnetization directions of the permanent magnets at both circumferential ends of the first magnetic pole and the magnet centerline of the associated permanent magnet ranging from θ1 to θ2.

19. The rotary electric machine of claim 16, wherein
a bearingless motor supports the rotor in a non-contact manner.

* * * * *